United States Patent
Kim

(10) Patent No.: US 10,037,757 B2
(45) Date of Patent: Jul. 31, 2018

(54) VOICE RECOGNITION APPARATUS AND METHOD OF RECOGNIZING VOICE

(71) Applicant: LG INNOTEK CO., LTD., Seoul (KR)

(72) Inventor: Ki Cheol Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 26 days.

(21) Appl. No.: 14/420,768

(22) PCT Filed: Dec. 6, 2012

(86) PCT No.: PCT/KR2012/010567
§ 371 (c)(1),
(2) Date: Feb. 10, 2015

(87) PCT Pub. No.: WO2014/030809
PCT Pub. Date: Feb. 27, 2014

(65) Prior Publication Data
US 2015/0187354 A1    Jul. 2, 2015

(30) Foreign Application Priority Data

Aug. 20, 2012 (KR) .................. 10-2012-0090513

(51) Int. Cl.
*G10L 15/22* (2006.01)
*G06F 3/16* (2006.01)

(52) U.S. Cl.
CPC .............. *G10L 15/22* (2013.01); *G06F 3/167* (2013.01); *G10L 2015/223* (2013.01)

(58) Field of Classification Search
CPC .................................................. G10L 15/222
See application file for complete search history.

(56) References Cited

U.S. PATENT DOCUMENTS

| | | | |
|---|---|---|---|
| 4,401,852 A * | 8/1983 | Noso .................. | B60R 16/0373 367/198 |
| 6,012,030 A * | 1/2000 | French-St. George ............ | H04M 1/72522 704/270 |
| 6,532,447 B1 * | 3/2003 | Christensson ........ | H04M 1/271 327/517 |
| 6,556,968 B1 * | 4/2003 | Shiono .................... | G10L 15/20 704/226 |
| 9,263,044 B1 * | 2/2016 | Cassidy .................... | G06K 9/00 |
| 9,318,129 B2 * | 4/2016 | Vasilieff .................. | G10L 25/78 |

(Continued)

FOREIGN PATENT DOCUMENTS

KR    10-2010-0120958 A    11/2010

OTHER PUBLICATIONS

International Search Report in International Application No. PCT/KR2012/010567, filed Dec. 6, 2012.

*Primary Examiner* — Brian L Albertalli
(74) *Attorney, Agent, or Firm* — Saliwanchik, Lloyd & Eisenschenk

(57) ABSTRACT

A voice recognition apparatus according to the embodiment includes a first user input unit for receiving a first user command; a second user input unit for receiving a second user command; and a control unit for executing a specific function according to a combination of the first and second user commands input through the first and second user input units.

2 Claims, 4 Drawing Sheets

(56) References Cited

U.S. PATENT DOCUMENTS

| | | | |
|---|---|---|---|
| 2002/0032567 A1* | 3/2002 | Lindholm | G10L 15/22 704/246 |
| 2003/0033143 A1* | 2/2003 | Aronowitz | G10L 15/20 704/233 |
| 2003/0095675 A1* | 5/2003 | Marlow | F02B 75/22 381/110 |
| 2003/0138118 A1* | 7/2003 | Stahl | G10L 15/26 381/107 |
| 2003/0212562 A1* | 11/2003 | Patel | G10L 15/30 704/275 |
| 2004/0101145 A1* | 5/2004 | Falcon | H04S 7/00 381/64 |
| 2005/0021341 A1* | 1/2005 | Matsubara | G10L 15/07 704/275 |
| 2005/0192810 A1* | 9/2005 | Konig | B60R 16/0373 704/275 |
| 2005/0288934 A1* | 12/2005 | Omi | G06F 3/038 704/270 |
| 2006/0200345 A1* | 9/2006 | Kooiman | G10L 15/20 704/233 |
| 2008/0040108 A1* | 2/2008 | Nakagawa | G10L 15/065 704/231 |
| 2008/0071547 A1* | 3/2008 | Prieto | B60N 2/002 704/275 |
| 2008/0167868 A1* | 7/2008 | Kanevsky | G10L 15/20 704/233 |
| 2009/0018829 A1 | 1/2009 | Kuperstein | |
| 2009/0240496 A1* | 9/2009 | Yamamoto | G10L 15/20 704/233 |
| 2009/0254342 A1* | 10/2009 | Buck | G10L 15/222 704/233 |
| 2009/0313014 A1* | 12/2009 | Shin | G10L 15/22 704/235 |
| 2010/0029387 A1 | 2/2010 | Luisi | |
| 2010/0283735 A1 | 11/2010 | Kim et al. | |
| 2010/0286983 A1 | 11/2010 | Cho | |
| 2010/0318366 A1* | 12/2010 | Sullivan | H04M 1/72519 704/275 |
| 2011/0010174 A1* | 1/2011 | Longe | G10L 15/24 704/235 |
| 2011/0022393 A1* | 1/2011 | Waller | G01C 21/3608 704/270 |
| 2011/0060589 A1 | 3/2011 | Weinberg | |
| 2011/0074693 A1* | 3/2011 | Ranford | G01C 21/3608 345/173 |
| 2011/0238191 A1* | 9/2011 | Kristjansson | G06F 1/1626 700/94 |
| 2012/0065971 A1* | 3/2012 | Schrager | H04M 1/6066 704/235 |
| 2012/0260177 A1* | 10/2012 | Sehrer | G06F 17/24 715/727 |
| 2013/0197907 A1* | 8/2013 | Burke | G10L 15/22 704/231 |
| 2015/0302854 A1* | 10/2015 | Clough | G06F 19/3418 704/275 |

* cited by examiner

[Fig. 1]
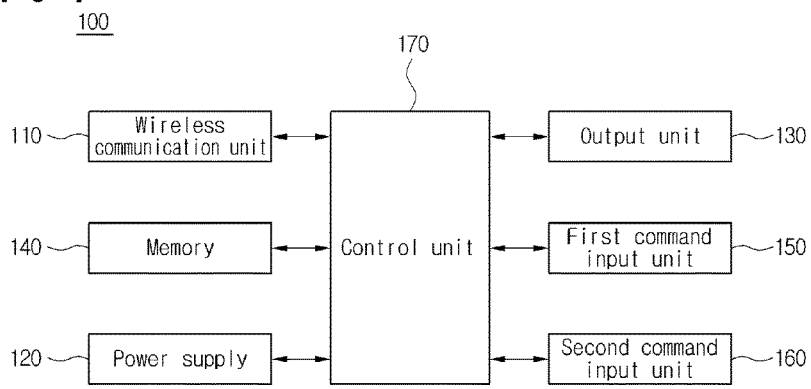
[Fig. 2]
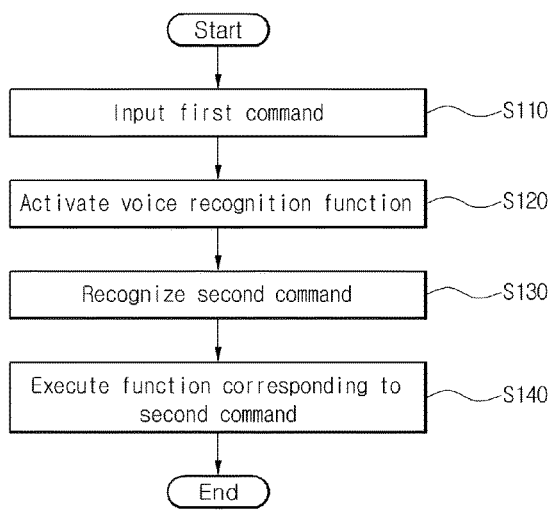
[Fig. 3]
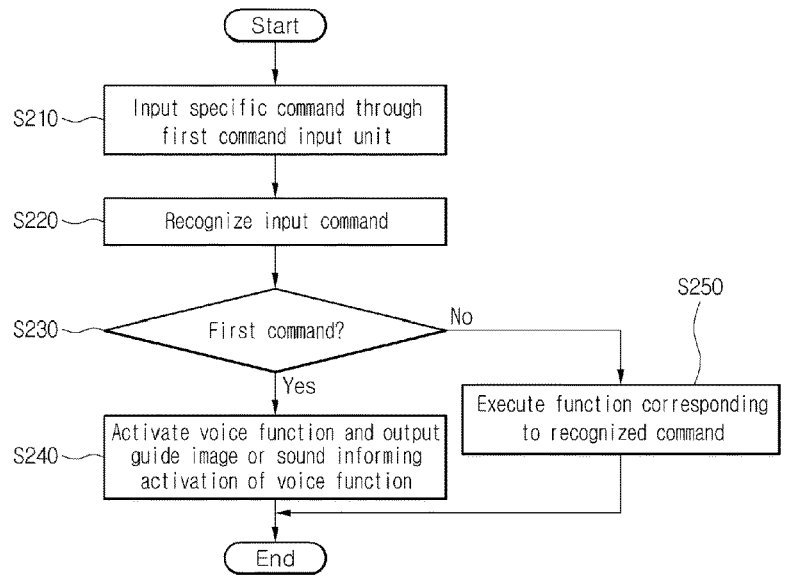

[Fig. 4]
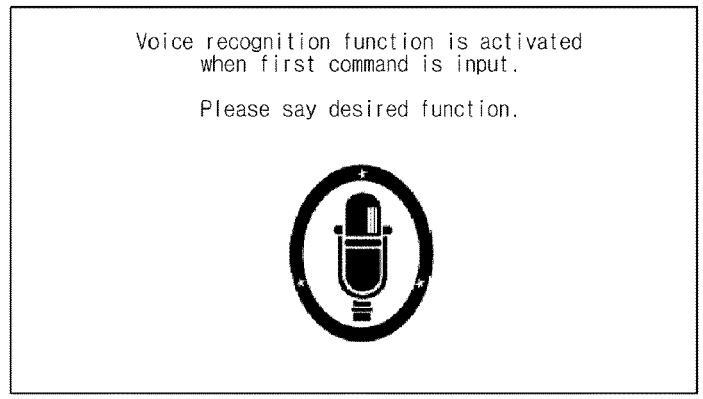
[Fig. 5]
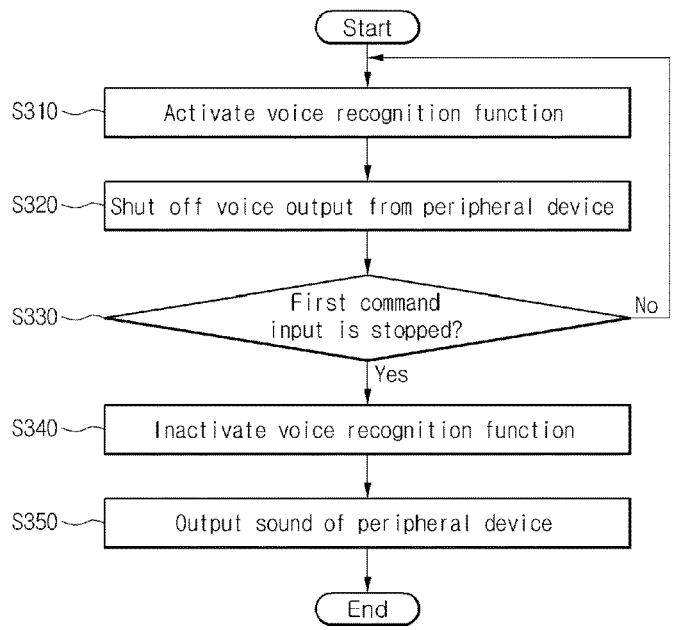
[Fig. 6]
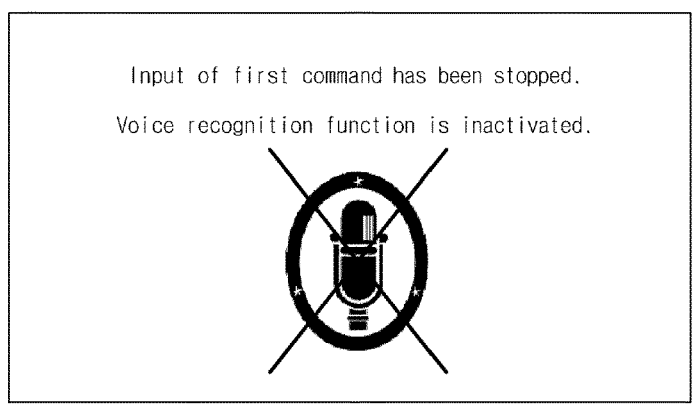

[Fig. 7]
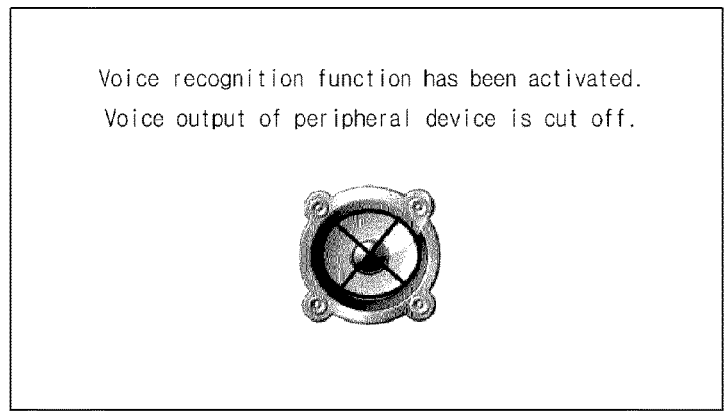
[Fig. 8]
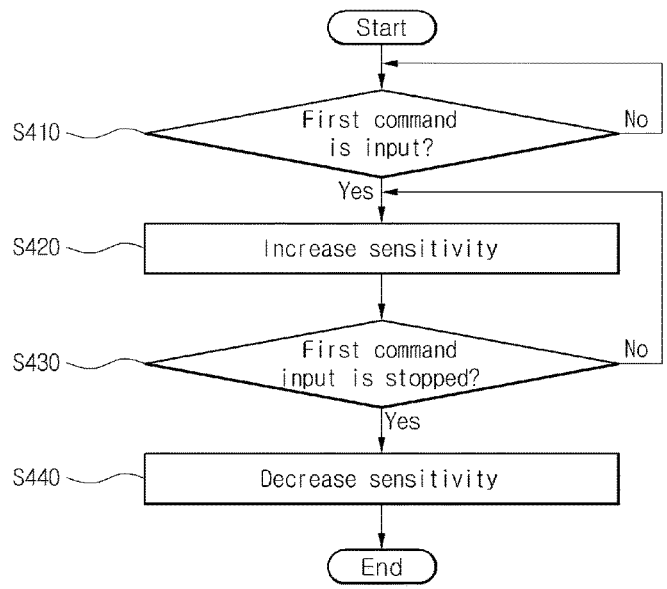
[Fig. 9]
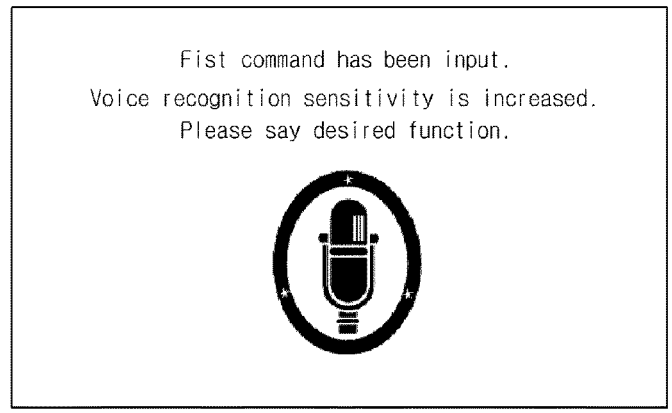

[Fig. 10]
This is image for setting voice recognition sensitivity.
Please set voice recognition sensitivity according to use environment.
Ordinary times
When first command is input

VOICE RECOGNITION APPARATUS AND METHOD OF RECOGNIZING VOICE

CROSS-REFERENCE TO RELATED APPLICATIONS

This application is the U.S. national stage application of International Patent Application No. PCT/KR2012/010567, filed Dec. 6, 2012, which claims priority to Korean Application No. 10-2012-0090513, filed Aug. 20, 2012, the disclosures of each of which are incorporated herein by reference in their entirety.

TECHNICAL FIELD

The embodiment relates to a voice recognition apparatus. More particularly, the embodiment relates to a voice recognition apparatus which can improve reliability of voice recognition and a method of recognizing a voice thereof.

BACKGROUND ART

Terminals may be classified into mobile/portable terminals and stationary terminals according to mobility. The mobile/portable terminals may be further classified into handheld terminals and vehicle mount terminals according to possibility of portability by a user.

As functions of the terminal are diversified, the terminal is implemented as a multimedia player provided with composite functions such as photographing of photos or moving pictures, playback of music or moving picture files, game play, or broadcasting service.

Meanwhile, the terminal recognizes a user command by using a touch screen, a remote controller, a local key button and a voice recognition module and executes a function corresponding to the recognized user command.

The touch screen recognizes an X-Y coordinate of a screen touched by a user and executes a function corresponding to the recognized coordinate. A user may touches one of menu items displayed on the touch screen, and the terminal recognizes the X-Y coordinate corresponding to the point touched on the touch screen and executes the function corresponding to the X-Y coordinate.

However, in the above described scheme for executing a function using a touch screen, since a user must exactly touch a desired touch point after confirming the desired touch point while continuously watching the touch screen, the user may feel inconvenient when using it while driving a vehicle.

When the function is executed by recognizing a voice, a voice recognition module is always maintained in an active state, so that an ambient noise may be misrecognized as a user voice, so the apparatus may malfunction.

Although the voice recognition function may be turned on or off to solve the above problem, the voice recognition function must be turned on when the voice recognition function is used and then turned off after the voice recognition function is completed, causing the inconvenience.

DISCLOSURE OF INVENTION

Technical Problem

The embodiment provides a voice recognition apparatus and a method of recognizing a voice thereof, which can increase a voice recognition detection rate so that the reliability of the voice recognition function can be improved.

The embodiment provides a voice recognition apparatus and a method of recognizing a voice thereof, which can prevent a malfunction due to voice misrecognition by activating the voice recognition function only when a specific-user input incorporating with the voice recognition function exists.

Meanwhile, the embodiments are not limited to the above object, and those skilled in the art can clearly understand other objects from following description.

Solution to Problem

According to the embodiment, there is provided a voice recognition apparatus. The voice recognition apparatus includes: a first user input unit for receiving a first user command; a second user input unit for receiving a second user command; and a control unit for executing a specific function according to a combination of the first and second user commands input through the first and second user input units.

The first and second user input units receive the first and second user commands, which are different from each other, respectively.

The first user input unit includes at least one of a touch screen, a remote control apparatus, a local key and a key button related to the voice recognition apparatus, and the second user input unit includes a voice recognition module for recognizing a user voice.

The control unit activates the second user input unit to receive the second user command when the first user command is input through the first user input unit.

The control unit activates the second user input unit while the first user command is being input through the first user input unit and inactivates the second user input unit when the input of the first user is stopped.

The first user command includes a command for activating the second user input unit.

The control unit outputs a control signal for shutting off an audio output of a peripheral device when the first user command is input.

The control unit increases a sensitivity of a voice recognition function which is performed through the second user input unit when the first user command is input.

Meanwhile, according to the embodiment, there is provided a method of recognizing a voice. The method of recognizing a voice includes the steps of: receiving a first user command; receiving a second user command as the first user command is input; and executing a specific function corresponding to the second user command.

The first user command includes a command for activating a voice recognition function of receiving the second user command.

The first user command is input through at least one of a touch screen, a remote control apparatus, a local key and a key button related to the voice recognition apparatus, and the second user command includes a user voice recognized through a voice recognition module.

The receiving of the second user command includes the steps of: activating a voice recognition function as the first user command is input; and receiving the second user command while the first user command is being input.

The method further includes the step of inactivating the voice recognition function when the input of the first user command is stopped.

The method further includes the step of: shutting off an audio output through a peripheral device when the first user command is input.

The method further includes the step of increasing a voice recognition sensitivity for receiving the second user command to a first level as the first user command is input.

The method further includes the step of decreasing the voice recognition sensitivity to a second level lower than the first level when the input of the first user command is stopped, wherein the first and second levels are settable and changeable by a user.

Advantageous Effects of Invention

According to the embodiment, the voice recognition function is activated at the time that the first command for activating the voice recognition function is input, so that the detection rate of the voice recognition can be increased and malfunction due to voice misrecognition can be prevented.

According to the embodiment, since the activation of the voice recognition function is determined based on the specific command, the inconvenience of setting the activation of the voice recognition function on a menu screen can be removed.

In addition, according to the embodiment, when a user performs the voice recognition, the voice recognition rate can be increased by increasing the voice recognition sensitivity as the first command is input.

BRIEF DESCRIPTION OF DRAWINGS

FIG. 1 is a view illustrating a configuration of a voice recognition apparatus according to the embodiment; and FIGS. 2 to 10 are views illustrating a voice recognition method of the voice recognition apparatus according to the embodiment.

MODE FOR THE INVENTION

The advantages, the features, and schemes of achieving the advantages and features of the disclosure will be apparently comprehended by those skilled in the art based on the embodiments, which are detailed later in detail, together with accompanying drawings. The disclosure is not limited to the following embodiments but includes various applications and modifications. The embodiments will make the disclosure complete, and allow those skilled in the art to completely comprehend the scope of the present invention. Thus, the disclosure is defined only by the scopes of the claims.

Hereinafter, a voice recognition apparatus and a method of recognizing a voice thereof according to the embodiments which can execute a specific function in connection with a plurality of user input schemes will be described with reference to the accompanying drawings. It will be understood that each block may be implemented by computer program instructions. The computer program instructions can be provided in a processor of a general-purpose computer, a special-purpose computer or other programmable data processing apparatus. The instructions executed by the processor of the computer or other programmable data processing device create means for implementing the functions specified in the flow block diagram. These computer program instructions may also be stored in a computer-usable or computer-readable memory that can direct a computer or other programmable data processing apparatus to function in a particular manner. The computer program instructions stored in the computer-usable or computer-readable memory can produce an article of manufacture, including instruction means that implement the functions specified in the blocks of the flowcharts. The computer program instructions may also be loaded onto a computer or other programmable data processing apparatus so as to cause a series of operational steps to be performed on the computer or another programmable apparatus. The computer program instructions executed on the computer or other programmable apparatus produce a computer-based process and thereby provide steps for implementing the functions specified in the blocks of the flowcharts. Each block in the flowcharts may represent a part of modules, segments, or codes, which comprises one or more executable instructions for implementing the specified logical function(s).

It should also be noted that in some alternative implementations, the functions noted in the blocks may occur out of order. For example, two blocks shown in succession may in fact be executed substantially and concurrently or the blocks may be executed in the reverse order, depending on the functionality involved.

As used in this embodiment, the term~unit or~module refers to software or a hardware structural element such as FPGA or ASIC, and the~unit or~module perform some roles. However, the~unit or~module is not limited to software or hardware. The~unit or~module can be configured to be stored in an addressable storage medium and to play at least one processor. Accordingly, for example, the~unit or~module includes software structural elements, object-oriented software structural elements, class structural elements, task structural elements, processes, functions, attributes, procedures, subroutines, segments of a program code, drivers, firmware, microcode, circuit, data, database, data structures, tables, arrays, and variables. Functions provided in structural elements and~units or~module may be engaged by the smaller number of structural elements and~units or~module, or may be divided by additional structural elements and~units or~module.

Hereinafter, the embodiment will be described in detail with reference to the accompanying drawings.

A voice recognition apparatus according to the embodiment may be a terminal. The terminal may include a mobile phone, a smart phone, a laptop computer, a digital broadcasting receiver, PDA (Personal Digital Assistants), PMP (Portable Multimedia Player), and a navigation device. It may be easily understood by those skilled in the art that the configuration disclosed through the embodiment is applicable to a terminal such as a digital TV or a desktop computer.

It is assumed in the embodiment that the voice recognition apparatus is a navigation device installed in a vehicle. However, this is just one example of the embodiment and thus, it is obvious that the voice recognition apparatus may include one of the above-mentioned terminals as well as the navigation device.

FIG. 1 is a block diagram illustrating a configuration of a voice recognition apparatus according to the embodiment.

Referring to FIG. 1, the voice recognition apparatus 100 includes a wireless communication unit 110, a power supply 120, an output unit 130, a memory 140, a first command input unit 150, a second command input unit 160, and a control unit 170.

The wireless communication unit 110 may include at least one module capable of performing wireless communication between the voice recognition apparatus 100 and a wireless communication system or a network in which the voice recognition apparatus 100 is located.

For example, the wireless communication unit 110 may include a broadcasting receiver module, a wireless Internet module, a short range communication module, and a location information module.

The broadcasting receiver module receives a broadcasting signal and/or information about the broadcasting from an external broadcasting management server through a broadcasting channel.

The broadcasting channel may include a satellite channel and a terrestrial broadcasting channel. The broadcasting management server may be a server which generates and transmits a broadcasting signal and/or information about the broadcasting, or a server which receives a previously generated broadcasting signal and/or information about the broadcasting and transmit it to the voice recognition apparatus 100. The broadcasting signal may include a TV broadcasting signal, a radio broadcasting signal, a data broadcasting signal and a broadcasting signal of a combined type of the TV broadcasting signal and the radio broadcasting signal.

The broadcasting-related information may include information about a broadcasting channel, a broadcasting program or a broadcasting service provider.

The broadcasting-related information may have various types. For example, the broadcasting-related information may have a type such as DMB (Digital Multimedia Broadcasting)의 EPG (Electronic Program Guide) or DVB-H (Digital Video Broadcast-Handheld)의 ESG (Electronic Service Guide).

For example, the broadcasting receiver module may receive a digital broadcasting signal through a digital broadcasting system such as DMB-T (Digital Multimedia Broadcasting-Terrestrial), DMB-S (Digital Multimedia Broadcasting-Satellite), MediaFLO (Media Forward Link Only), DVB-H (Digital Video Broadcast-Handheld), and ISDB-T (Integrated Services Digital Broadcast-Terrestrial). Further, the broadcasting receiver module may be configured to be suitable to any other broadcasting system as well as the above-described digital broadcasting system.

The broadcasting signal and/or broadcasting-related information received through the broadcasting receiver module may be stored in the memory 140.

The wireless Internet module may be a module for access to wireless Internet, and may be installed at an inside or outside of the voice recognition apparatus 100. Wireless Internet techniques may include WLAN (Wireless LAN/Wi-Fi), Wibro (Wireless broadband), Wimax (World Interoperability for Microwave Access), and HSDPA (High Speed Downlink Packet Access).

The short range communication module is a module for short range communication. The short range communication techniques may include Bluetooth, RFID (Radio Frequency Identification), IrDA (Infrared Data Association), UWB (Ultra Wideband) and ZigBee.

The location information module is a module for obtaining a location of the voice recognition apparatus 100. For example, the location information module may be a GPS (Global Position System) module.

The power supply 120, which will be described below, uses power which is applied from an external power source or an internal power source thereto and supplies power necessary to operate each element of the voice recognition apparatus 100 to each element, under control of the control unit 170.

The output unit 130 may generate a visual or acoustic output and may include a display and an audio output module.

The display displays (or outputs) the information processed by the voice recognition apparatus 100. For example, a UI (User Interface) or a GUI (Graphic User Interface) related to an operation executed in the voice recognition apparatus 100 is displayed on the display.

The display may include at least one of an LCD (liquid crystal display), a TFT LCD (thin film transistor-liquid crystal display), an OLED (organic light-emitting diode), a flexible display, and a 3D display.

Some of the above displays may be configured in a transparent type or a light transmittance type to look out the outside therethrough. The display may be called a transparent display. A representative example of the transparent display includes a TOLED (Transparent OLED). A rear structure of the display may be configured in a light transmittance type. Due to this structure, a user may look an object located in the rear of the body of the display through an area occupied by the display of the voice recognition apparatus.

According to an implementation example of the voice recognition apparatus 100, there may be two displays or more. For example, the voice recognition apparatus 100 may include the plurality of displays spaced apart from each other or integrally disposed on one surface, or disposed on mutually different surfaces.

Meanwhile, when a sensor (hereinafter, referred to as 'a touch sensor') for sensing a touch operation and the display are constructed in a layer structure, the display may be used as the input unit as well as the output unit. For example, the touch sensor may have a type of a touch film, a touch sheet or a touch pad.

The touch sensor may be configured to convert a pressure applied to a specific portion of the display or a variation of capacitance generated from the specific portion of the display into an electrical input signal. The touch sensor may be configured to detect a pressure when touching the display as well as the touched location and area.

When the touch input is generated with respect to the touch sensor, the signal(s) corresponding to the touch input is transferred to a touch controller. The touch controller processes the signal(s) and transfers data corresponding to the signal(s) to the control unit 170. Thus, the control unit 170 may know which area is touched in the display.

The audio output module may receive audio data received from the wireless communication unit 110 or stored in the memory 140, in a voice recognition mode, a broadcasting receiving mode or a road guide mode. The audio output module may outputs an audio signal related to a function (for example, a road guide sound) performed in the voice recognition apparatus 100. The audio output module may include a receiver, a speaker and a buzzer.

The memory 140 may store a program for operating the control unit 170 and may temporarily store input/output data (for example, a still image or a moving image). The memory 140 may store data about vibrations and audio of various patterns output when a touch input occurs on the touch screen.

The memory 140 may include a storage medium having at least one type of a flash memory type, a hard disk type, a multimedia card micro type, a card type of a memory (for example, an SD or XD memory), RAM (Random Access Memory), SRAM (Static Random Access Memory), ROM (Read-Only Memory), EEPROM (Electrically Erasable Programmable Read-Only Memory), PROM (Programmable Read-Only Memory), MRAM (Magnetic RAM), a magnetic disc, and an optical disc.

Meanwhile, the voice recognition apparatus 100 according to the embodiment may further include an interface unit which performs a function of interfacing all external devices connected to the voice recognition apparatus 100 with each other.

The interface unit may receive data or power from an external device, transfer the data or power to each element in the voice recognition apparatus 100, or transmit data of the voice recognition apparatus to an external device. For example, the interface unit may include a wire/wireless headset port, an external charger port, a wire/wireless data port, a memory card port, a port of connecting a device having an identity module, an audio I/O (input/output) port, a video I/O (input/output) port and a earphone port.

The interface unit may be a path through which the power is provided from an external cradle to the voice recognition apparatus 100 or the command signals of various types input through the cradle by a user is provided to the voice recognition apparatus 100 when the voice recognition apparatus 100 is connected to the cradle. The command signals of various types or the power input from the cradle may be used as a signal through which the voice recognition apparatus 100 recognizes the fact that the cradle is exactly installed thereto.

The first command input unit 150 is a first type of user command input device.

For example, the first command input unit 150 may receive a user input signal, such as power on/off, destination searching, road guide start, or display setting, from a remote control device (for example, a remote controller) through various communication schemes such as an radio frequency communication scheme or an IR communication scheme, and transfer it to the control unit 170. That is, the first command input unit 150 may be the remote control device in itself, and may be a receiving unit for receiving a signal from the remote control device.

For example, the first command input unit 150 may be a local key receiving unit for transferring a user command input from a local key such as a power key, a road guide key, or a volume key, to the control unit 170.

As described above, the first command input unit 150 may be a touch screen through which a specific menu item displayed on the display is selected by a screen touch of the display.

For example, the first command input unit 150 may transfer a user input signal input from a sensing unit (not shown) for sensing a gesture of a user to the control unit 170. The sensing unit (not shown) may include a touch sensor, a voice sensor, a location sensor, and a motion sensor.

For example, the first command input unit 150 may be a key button disposed at a handle of a vehicle having the voice recognition apparatus 100 in connection with the voice recognition apparatus 100.

The second command input unit 160 is a second type of user command input device different from the first command input unit 150 having the first type.

The second command input unit 160 may be a voice recognition module for recognizing a user voice. It is assumed that the voice recognition module is a commercial voice recognition module which is able to set a recognition word for isolated word recognition, have a speaker-independent recognition function and output recognition estimated accuracy about a recognition word and a corresponding word in units of % according to a recognition result.

To do this, the second command input unit 160 may include a microphone for inputting a voice, a filter for removing a noise from the input voice, an analyzer for analyzing the voice signal from which a noise is removed through the filter, and a signal converter for converting an analog voice signal into a digital voice signal and outputting the digital voice signal.

The control unit 170 controls overall operations of the voice recognition apparatus.

For example, when the voice recognition apparatus 100 is a navigation device, the control unit 170 may search for a destination corresponding to a user input and allow the road guide function corresponding to the searched destination to be executed.

Hereinafter, the operation of the control unit 170 will be described while focusing on the voice recognition function.

The control unit 170 controls the operation of the voice recognition apparatus 100 based on the combination of the plurality of user commands input through the first and second command input units 150 and 160.

The control unit 170 first inactivates the second command input unit 160. For example, the second command input unit 160 is inactivated at ordinary times such that the voice recognition operation is not performed.

The voice recognition function by the second command input unit 160 may be activated according to a command input through the first command input unit 150.

To do this, the control unit 170 receives the command input through the first command input unit 150, and operates the second command input unit 160 when the received command is a preset first command, such that the voice recognition function is activated.

The first command may be a command for activating the second command input unit 160.

For example, the first command input may be a case that a specific menu item is touched on the touch screen. Specifically, the specific menu item may be a menu item for activating the second command input unit 160.

To the contrary, the first command input may be a case that a specific area (an arbitrary area to which a specific menu is not assigned) is touched on the touch screen.

Further, to the contrary, the first command input may be a case that a local key to which a function for activating the voice recognition function is assigned is input.

To the contrary, the first command input may be a case that a specific key of keys included in the remote control device to which the function for activating the voice recognition function is assigned is input.

To the contrary, the first command input may be a case that a specific key to which the function for activating the voice recognition function is assigned is input by an input device (for example, a key button installed on a handle of a vehicle).

Thus, as described above, the control unit 170 receives a command input through the first command input unit 150 and identifies whether the received command is the first command for activating the voice recognition function.

At this time, if the command input through the first command input unit 150 is not the first command, the control unit 170 executes the function corresponding to the command input through the first command input unit 150. For example, if the command input through the first command input unit 150 is a command for searching for a destination, the control unit 170 executes a destination searching function corresponding to the input command.

If the command input through the first command input unit 150 is the first command, the control unit 170 operates the second command input unit 160 according to the first command. That is, the control unit 170 activates the voice recognition function by operating the second command input unit 160 (for example, a microphone) as the first command is input.

At this time, the control unit 170 activates the voice recognition function only while the first command is being input through the first command input unit 150.

In other words, if the first command is being input continuously through the first command input unit 150, the control unit 170 activates the voice recognition function, and if the input of the first command through the first command input unit 150 is stopped, the control unit 170 inactivates the voice recognition function.

If the first command is input by touching an arbitrary point of the touch screen, the control unit 170 activates the voice recognition function only while the touch operation for the arbitrary point is being performed, and if the touch operation is stopped, the control unit 170 inactivates the voice recognition function.

Thus, the second command input unit 160 is only operated to perform the voice recognition during the time period that the first command for activating the voice recognition function through the first command input unit 150 is input.

At this time, a user desired voice must be just recognized to increase the voice recognition rate. However, various voices may occur near the voice recognition apparatus 100 in use.

Thus, as the voice recognition function is activated, the control unit 170 shuts off an audio output of a peripheral device near the voice recognition apparatus 100. For example, the control unit 170 shuts off an output of an audio output device such as an audio player or a radio receiver as the voice recognition function is activated.

To do this, the control unit 170 outputs a control signal for shutting off the audio output of the peripheral device through the wireless communication unit 110. Then, the peripheral device shuts off the output of the audio signal by using the control signal.

Meanwhile, although it is assumed in the above description that the voice recognition function is only activated at the time that the first command is input, the voice recognition function may be activated at the time that the first command is not input.

For example, a voice recognition condition during a period in which the first command is being input may be set differently from a voice recognition condition during a period in which the first command is not input such that the control unit 170 may achieve the voice recognition through the second command input unit 160.

The voice recognition condition may include sensitivity for performing the voice recognition. The sensitivity has high relationship to the voice recognition rate.

Thus, the control unit 170 sets the sensitivity at a first level at the time that the first command is not input in order to decrease the voice recognition rate, so that the user voice may be recognized more exactly. The control unit 170 controls the sensitivity at the time that the first command is input such that the sensitivity is set at the second level higher than the first level, thereby increasing the voice recognition rate.

According to the embodiment, the voice recognition function may be activated only when the first command for activating the voice recognition function is input, so that the voice recognition detection rate may be increased and the malfunction due to voice misrecognition may be prevented.

FIG. 2 is a flowchart schematically illustrating a method of recognizing a voice according to the embodiment.

Referring to FIG. 2, in step S110, the first command input unit 150 receives the first command so that the first command is transferred to the control unit 170.

In step S120, as the first command is input to the control unit 170 through the first command input unit 150, the control unit 170 activates the voice recognition function. That is, if the first command is input through the first command input unit 150, the control unit 170 operates the second command input unit 160 so that a user voice is recognized.

At this time, the control unit 170 either maintains the activation of the voice recognition function or inactivates the voice recognition function according to whether the first command is continuously input through the first command input unit 150.

In step S130, the second command input unit 160 recognizes the second command according to the user voice input from an outside as the voice recognition function is activated and thus, transfers the recognized second command to the control unit 170.

At this time, the second command is recognized only while the first command is continuously being input and is transferred to the control unit 170. That is, if the input of the first command is stopped, the second command input unit 160 is inactivated, so that the second command input unit 160 does not longer recognize the second command.

Thus, as the first command is recognized, the second command input unit 160 is operated while the activation of the voice recognition function is maintained by the control unit 170, so that the second command is recognized.

In step S140, as the second command is transferred to the control unit 170 through the second command input unit 160, the control unit 170 executes the function corresponding to the second command.

Hereinafter, the voice recognition method illustrated in FIG. 2 will be described in more detail.

FIG. 3 is a view illustrating a method of activating the voice recognition according to the embodiment.

Referring to FIG. 3, in step S210, a specific command is input through the first command input unit 150. At this time, the input command may be the first command for activating the voice recognition function or another command different from the first command.

In step S220, as the specific command is input through the first command input unit 150, the input command is transferred to the control unit 170, so that the control unit 170 recognizes the command transferred though the first command input unit 150.

In step S230, if the control unit 170 recognizes the command, the control unit 170 determines whether the recognized command is the first command for activating the voice recognition function or another command for executing a specific function that is not the first command.

As the determination result by step S230, if the recognized command is the first command for activating the voice recognition function, in step S240, the control unit 170 outputs a guide image or a guide audio informing a user that the voice recognition function has been activated while activating the voice recognition function.

FIG. 4 is a view showing the guide image according to the embodiment.

That is, as the input of the first command is recognized, the control unit 170 displays the guide image including a guide message such as Please say desired function together with a message of Voice recognition function is activated while the first command is being input through the output unit 130.

Meanwhile, as the determination result of step S230, if the recognized command is not the first command but another command, in step S250, the control unit 170 performs an operation corresponding to the input command.

For example, if the input command is a command for initiating a road guide, the control unit 170 starts to do a destination guide broadcasting corresponding to the command input by the user.

FIG. 5 is a view illustrating an additional function according to the activation of the voice recognition function according to the embodiment.

Referring to FIG. 5, in step S310, the control unit 170 activates the voice recognition function as the first command is input.

At this time, the control unit 170 shuts off an ambient sound in order to increase the voice recognition detection rate as the voice recognition function is activated. That is, in step S320, the control unit 170 transmits an audio output shutoff signal to a peripheral device (for example, an audio player or a radio receiver) located around the audio recognition apparatus 100, such that any sound is not output through the peripheral device.

Meanwhile, in step S330, the control unit 170 determines whether the first command is continuously input through the first command input unit 150.

In other words, in step S330, the control unit 170 determines whether the input of the first command is stopped (released).

In step S340, as the determination result, if the input of the first command is stopped, the control unit 170 inactivates the activated voice recognition function. That is, the control unit 170 allows the operation of the second command input unit 160 to be stopped.

As shown in FIG. 6, the control unit 170 displays the guide image informing that the input of the first command is stopped and the voice recognition function is inactivated.

In step S350, as the voice recognition function is inactivated, the control unit 170 releases the audio output shutoff of the peripheral device.

As shown in FIG. 7, as the first command is input, the control unit 170 displays the guide image informing that the audio output of the peripheral device is shut off.

The guide image may include a message informing that the audio output of the peripheral device is cut off as the voice recognition function is activated. Meanwhile, although the guide image including only the above message is depicted in FIG. 7, this is just one example of the embodiment and the information about the peripheral device, which is shut off, may be output.

FIG. 8 is a view illustrating a sensitivity control method of the voice recognition apparatus according to the embodiment.

Referring to FIG. 8, in step S410, the control unit 170 determines whether the first command is input through the first command input unit 150.

As the determination result in step S410, if the first command is input through the first command input unit, in step 420, the control unit 170 increases the sensitivity for the voice recognition.

The sensitivity may be the sensitivity of a microphone constituting the second command input unit 160. As the sensitivity is increased, the voice recognition rate is increased.

In step S430, the control unit 170 determines whether the input of the first command through the first command input unit 150 is stopped.

In step S440, if the input of the first command is stopped, the control unit 170 decreases the increased sensitivity by one level. That is, as described above, the voice recognition function is inactivated when the input of the first command is stopped, but in another embodiment, although the input of the first command is stopped, only the sensitivity is decreased while the activation of the voice recognition function is maintained.

Since if the sensitivity of the voice recognition function is decreased, the second command input unit 160 recognizes only and more certainly the user voice, the malfunction due to voice misrecognition may be prevented.

As shown in FIG. 9, the control unit 170 display the message informing that the sensitivity of the voice recognition is increased as the first command is input.

Meanwhile, the above-described sensitivity may be set by a user.

As shown in FIG. 10, a menu image for setting a first sensitivity applied at the time (ordinary times) that the first command is not input and a second sensitivity applied while the first command is being input is provided.

The control unit 170 stores the first and second sensitivities in the memory and then, applies the first and second sensitivities in future such that the voice recognition function is executed.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The invention claimed is:

1. A voice recognition apparatus comprising:
    a first command input unit configured to receive an input signal;
    a second command input unit configured to receive and recognize a voice;
    a wireless communication part configured to transmit control signals to a peripheral device; and
    a control part configured to determine whether the input signal is a first command;
    wherein if the control part determines that the input signal is a first command, the control part is configured to activate the second command input unit if the second command input unit is in an inactivation state; and
    wherein if the control part determines that the input signal is not a first command, the control part is configured to perform a function according to the input signal;
    wherein if the input signal is determined to be the first command, the control part is configured to output a control signal shutting off an audio output of the peripheral device through the wireless communication part;
    wherein the control part is configured to:
    determine whether the first command is continually received through the first command input unit, if the first command is continually received through the first command input unit, voice recognition sensitivity of the second command input unit is increased; and if the input signal is not continually received through the first command input unit, the voice recognition sensitivity of the second command input unit is decreased; and wherein the activation of the second command input unit is maintained while the input signal is not received through the first command input unit.

2. A method of recognizing a voice, the method comprising:

inactivating a voice recognition function;

receiving an input signal through a first command input unit;

determining whether the input signal is a first command;

transmitting a control signal shutting off an audio output of a peripheral device through a wireless communication part if the input signal is determined to be the first command;

activating the voice recognition function if the input signal is determined to be the first command;

performing a function according to the input signal if the input signal is determined not to be a first command;

determining whether the first command is continually received through the first command input unit;

if the first command is continually received through the first command input unit, increasing voice recognition sensitivity of the voice recognition function to a first level;

if the first command is not continually received through the first command input unit, decreasing the voice recognition sensitivity of the voice recognition function to a second level;

wherein the activation of the voice recognition function is maintained while the input signal is not received through the first command input unit, and wherein the first and second levels are respectively settable and changeable.

* * * * *